US012288510B1

(12) United States Patent
Tsai et al.

(10) Patent No.: US 12,288,510 B1
(45) Date of Patent: Apr. 29, 2025

(54) LED DISPLAY CONFIGURATION SYSTEM FOR IMPROVING GRAYSCALE RECOGNITION OF HUMAN VISUAL IMAGES

(71) Applicant: STARLIGHT DISPLAY CORPORATION, Hsinchu (TW)

(72) Inventors: Yi-Yu Tsai, Hsinchu (TW); Shao-Wei Chiu, Hsinchu (TW); Yin-Cheng Huang, Hsinchu (TW)

(73) Assignee: STARLIGHT DISPLAY CORPORATION, Hsinchu (TW)

( * ) Notice: Subject to any disclaimer, the term of this patent is extended or adjusted under 35 U.S.C. 154(b) by 0 days.

(21) Appl. No.: 18/639,991

(22) Filed: Apr. 19, 2024

(51) Int. Cl.
*G09G 3/32* (2016.01)

(52) U.S. Cl.
CPC ....... *G09G 3/32* (2013.01); *G09G 2320/0276* (2013.01); *G09G 2320/0626* (2013.01); *G09G 2360/144* (2013.01)

(58) Field of Classification Search
None
See application file for complete search history.

(56) References Cited

U.S. PATENT DOCUMENTS

2007/0252856 A1* 11/2007 Hudson ................ G09G 3/2033 345/693
2009/0278866 A1* 11/2009 Kim ......................... G09G 3/20 345/213
2021/0280138 A1* 9/2021 Yum .................... G09G 3/3291
2023/0260466 A1* 8/2023 Jiang ........................ G09G 5/10 345/204
2023/0410712 A1* 12/2023 Chiu ........................ G09G 5/10
2024/0029627 A1* 1/2024 Li ............................ G09G 3/32

* cited by examiner

*Primary Examiner* — Dorothy Harris
(74) *Attorney, Agent, or Firm* — Fei-hung Yang

(57) ABSTRACT

An LED display screen configuration system for improving the gray scale recognition effect of human eyes used in a direct-view LED display screen sets a first current matched with a selected gamma value to output light to define a first brightness range, then uses a brightness X~100% in the first brightness range to form a first modulation interval and a brightness Y % as a minimum allowable value, and sets the next current to form the next modulation interval, and so on and so forth. In any two adjacent modulation intervals, the maximum brightness outputted from the latter modulation interval is equal to or slightly greater than the brightness X % of the previous modulation interval, so that the respective current outputs of the $1^{st}$ to the $N^{th}$ modulation intervals show a power decreasing relationship, so as to set or switch to the most suitable modulation interval for the practical brightness requirements.

15 Claims, 7 Drawing Sheets

LED DISPLAY CONFIGURATION SYSTEM FOR IMPROVING GRAYSCALE RECOGNITION OF HUMAN VISUAL IMAGES

BACKGROUND OF THE DISCLOSURE

Technical Field

The present disclosure relates to a display system, in particular to an LED display configuration system for improving grayscale recognition of human visual images.

Description of the Related Art

To adapt to the market demand of end-use products, the current setting of the LED screen is generally adjusted to the working brightness range during the manufacturing process of conventional display screens. However, this technical way of adjusting the current setting to achieve the required display brightness range has a color bias issue when the application of the display screen requires a large brightness range, and this issue is not conducive to the overall display quality of the products. In order to overcome this issue, some manufacturers proposed a method of multiplying a percentage coefficient by one of the original Gamma values to form a new Gamma value under a fixed current setting, and then using the new Gamma value to regulate the overall grayscale of the screen. In other words, the aforementioned method is expected to correct the visual brightness of the overall image by adjusting the recognition and balance of the color grayscale in the pixels through the accurate gamma correction of the percentage coefficient.

However, in this brightness adjustment method by multiplying the gamma value by a percentage factor according to the ratio of brightness demand, when the display screen requires a large range of brightness, the gamma value is over-adjusted due to the over-multiplication of the percentage factor, which results in the smoothing of the curves and the failure to present the grayscale normally. In view of this problem, the present discloser seeks a solution on how the Gamma value correction can be synchronized with the adjustment of current settings to form a number of adaptable brightness ranges that can be set by the display screen according to the ambient lighting, so as to improve the abovementioned technical deficiencies and to solve the problem of color casting and achieve the image presentation quality with the best Gamma modulation effect.

SUMMARY OF THE DISCLOSURE

The primary objective of the present disclosure is to provide an LED display configuration system used in a direct-view LED display screen, which uses a set current group with a decreasing order relationship and a selected gamma value to form a multiple of brightness range modulation intervals, which can be switched according to the actual usage conditions of the screen to achieve the optimal image grayscale presentation. At the same time, the present disclosure also proposes two LED display configuration systems with different switching sensitivities to match the time-varying brightness gradient performance under different environmental scenes, so as to effectively implement different service application area and devices.

To achieve the aforementioned objective, the present disclosure discloses an LED display configuration system with a higher switching sensitivity for improving the grayscale recognition of human visual images, and the LED display configuration system used in a direct-view LED display screen includes: a PWM dimming module for adjusting a brightness range expressed in percentage; a Gamma modulation module with a plurality of Gamma values provided for selection and modulation; a grayscale segment compensation module electrically connected to the PWM dimming module and the Gamma modulation module, where the grayscale segment compensation module includes N modulation intervals, N is an integer greater than or equal to 2, and each of the modulation intervals has a set current and defines the set currents as a first current to an $N^{th}$ current respectively; wherein the first modulation interval uses the first current and selects one of the Gamma values to output light, takes X % in the brightness range as a compensation reference value and Y % in the brightness range as a minimum allowable value, and sequentially configures the set currents corresponding to the first modulation interval to the $N^{th}$ modulation interval respectively according to the same compensation reference value; wherein in any two adjacent modulation intervals, the maximum brightness outputted by the set current in the next modulation interval is equal to or slightly greater than the brightness outputted at the compensation reference value in the previous modulation interval, so that the set currents corresponding to the first modulation interval to the $N^{th}$ modulation interval respectively show a power descending relationship; and the brightness outputted at the compensation reference value in the $N^{th}$ modulation interval is equal to or less than the brightness outputted at the minimum allowable value in the first modulation interval; wherein the modulation intervals use the brightness range of 100%~X % as a working section; and a switching module electrically connected to the grayscale segment compensation module for manually or automatically switch or select the modulation intervals.

Wherein, the value of X is greater than or equal to 50, and the value of Y is less than or equal to 10. The LED display configuration system further includes an ambient light sensing module electrically connected to the switching module for automatically sensing a current ambient light brightness to output an illumination level for reference, and manually switching and selecting the modulation intervals; or the ambient light sensing module outputting the illumination level to the switching module, such that the switching module automatically switches and selects the modulation intervals according to the illumination level. The switching module includes a switch determination device, which checks an average working brightness range of the direct-view LED display screen in a time interval after the direct-view LED display screen selects one of the modulation intervals for working, and the switch determination device, and feeds back a range switching signal to cause the switching module to automatically switch to the next modulation interval when it is known from the comparison that the average working brightness range falls in an overlapped range of two consecutive modulation intervals. Each of the modulation intervals adopts a different Gamma value, and each of the Gamma values sets a coefficient for improving a Gamma modulation effect.

To achieve the aforementioned objective, the present disclosure further discloses an LED display configuration system for improving grayscale recognition of human visual images, which has a slightly lower switching sensitivity than the aforementioned solution. This LED display configuration system, used in a direct-view LED display screen, for improving grayscale recognition of human visual images includes: a PWM dimming module for adjusting a brightness range expressed in percentage; a Gamma modulation module with a plurality of Gamma values provided for selection and modulation; a grayscale segment compensation module electrically connected to the PWM dimming module and the Gamma modulation module, where the grayscale segment compensation module has N modulation intervals, N is an integer greater than or equal to 2, and each of the modulation intervals has a set current and defines the set currents as a first current to an $N^{th}$ current respectively; wherein the first modulation interval uses the first current, selects one of the Gamma values to output light, takes X % in the brightness range as a compensation reference value and Y % in the brightness range as a minimum allowable value, and sequentially configures the set currents corresponding to the intervals after the first modulation interval to the $N^{th}$ modulation interval respectively according to the same compensation reference value; in any two adjacent modulation intervals, the maximum brightness outputted by the set current in the next modulation interval is less than the brightness outputted at the compensation reference value in the previous modulation interval, such that the set currents corresponding to the first modulation interval to the $N^{th}$ modulation interval respectively show a power descending relationship; and the $N^{th}$ modulation interval uses the compensation reference value to output a brightness equal to or less than the brightness outputted at the minimum allowable value in the first modulation interval; and a switching module electrically connected to the grayscale segment compensation module for manually or automatically switching and selecting the modulation interval.

Same as the solution above, the value of X is greater than or equal to 50, and the value of Y is less than or equal to 10. The LED display configuration system further includes an ambient light sensing module electrically connected to the switching module for automatically sensing a current ambient light brightness to output an illumination level for reference and manually switching and selecting the modulation intervals; the ambient light sensing module outputting the illumination level to the switching module, so that the switching module automatically switch and select the modulation intervals according to the illumination level. When N equals to 2, there is an interval with the 7~26% brightness range of the first modulation interval between the X % brightness outputted from the first modulation interval and the 100% brightness outputted from the second modulation interval. Wherein, each of the modulation intervals adopts a different Gamma value and each of the Gamma values sets a coefficient for improving a Gamma modulation effect.

In summation of the description above, the present disclosure combines the conventional technical means of adjusting a combination of currents and correcting the Gamma value to achieve the purpose of achieving high image grayscale recognition effect under large brightness range applications. In other words, through the operation of the $1^{st}$ to $N^{th}$ currents in a power descending relationship together with the selection of each of the Gamma values provides a technical means for the $1^{st}$~$N^{th}$ modulation intervals with the power relationship to achieve the image display capability of a large brightness range, so as to facilitate the switching the direct-view LED display screen according to the actual use environment. In the modulation intervals, the working brightness range that meets the ambient lighting requirements can be switched and selected to improve the market adaptability and economic benefits of screen products.

DESCRIPTION OF THE PREFERRED EMBODIMENTS

The following description of the preferred embodiments is provided in reference to the accompanying drawings in order to enable persons having ordinary skill in the art to clearly understand the technical contents and features of the present disclosure.

Figure 1:
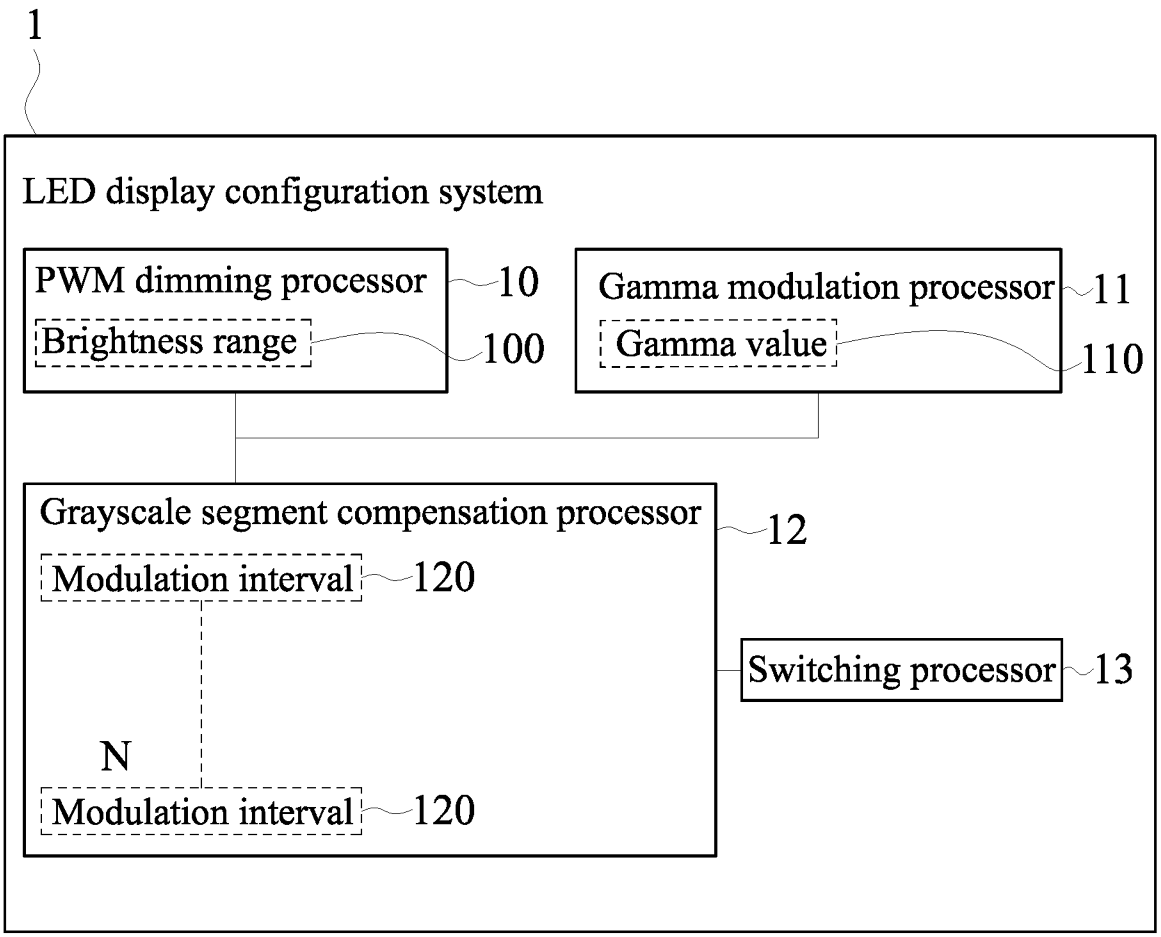
FIG. 1 is a block diagram showing the structure of a first preferred embodiment of the present disclosure.
Figure 2:
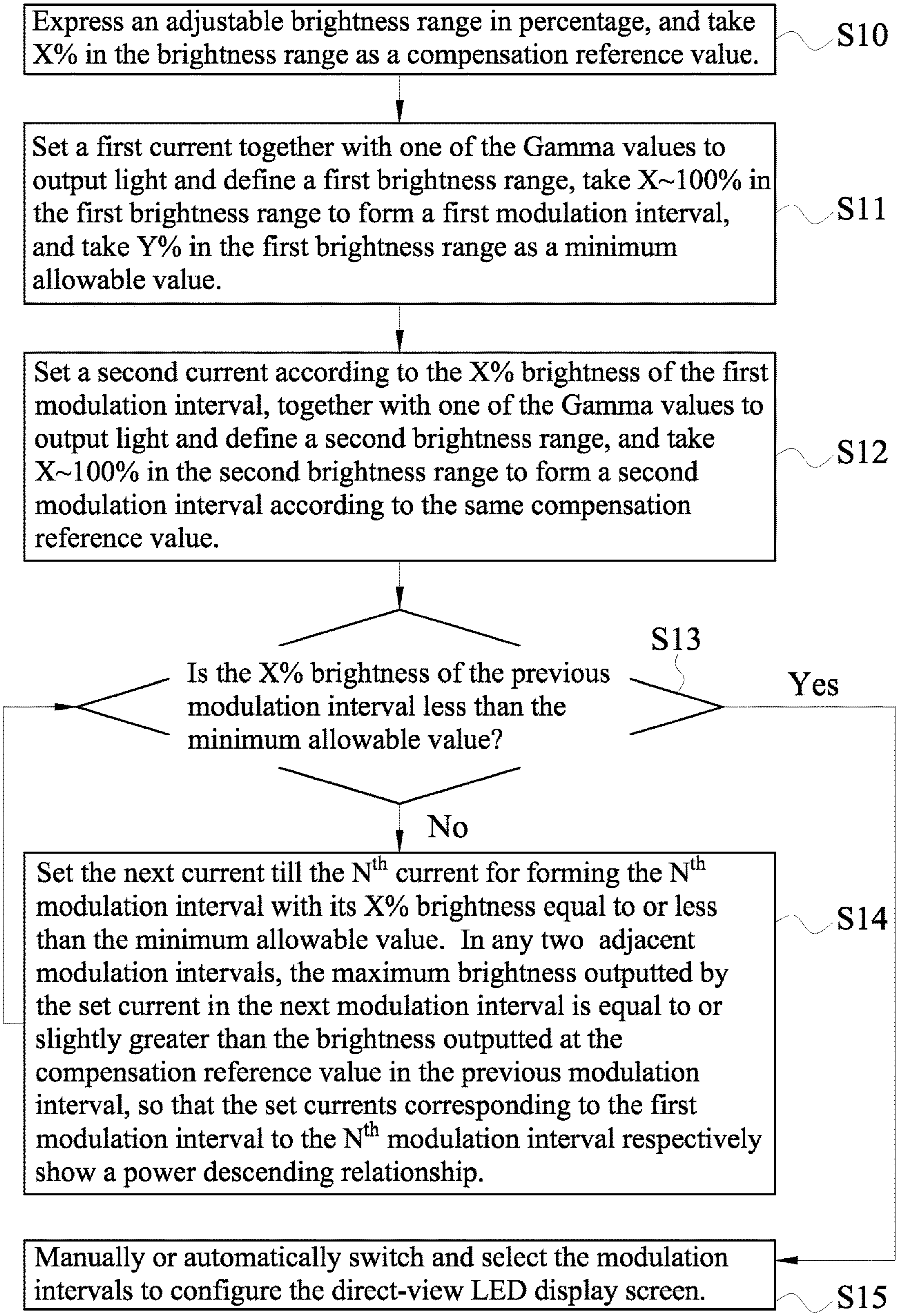
FIG. 2 is a flow chart showing the operation of the first preferred embodiment of the present disclosure.
Figure 3A:
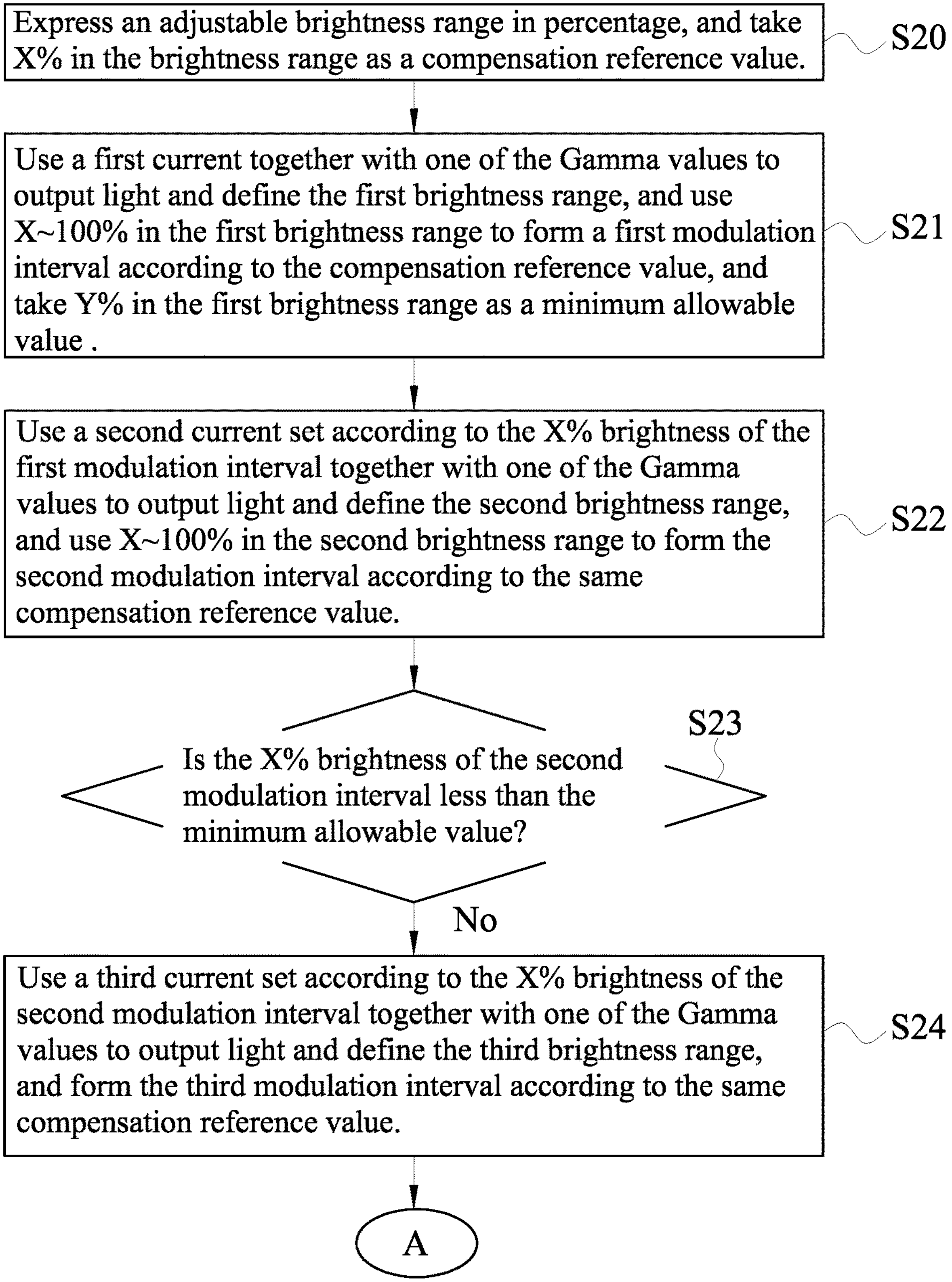
FIGS. 3A and 3B are flow charts showing the operation of a second preferred embodiment of the present disclosure.
Figure 3B:
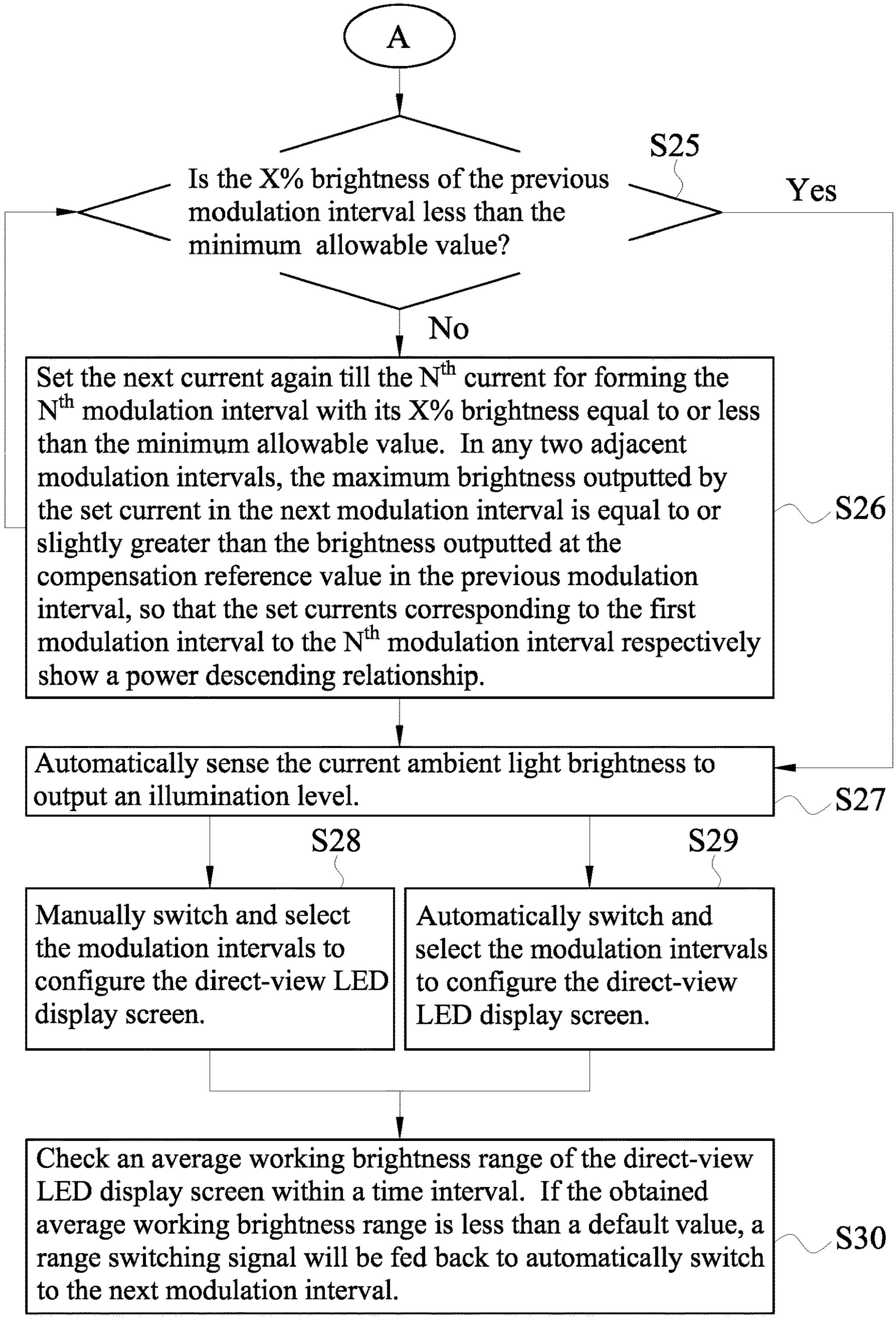
Figure 4:
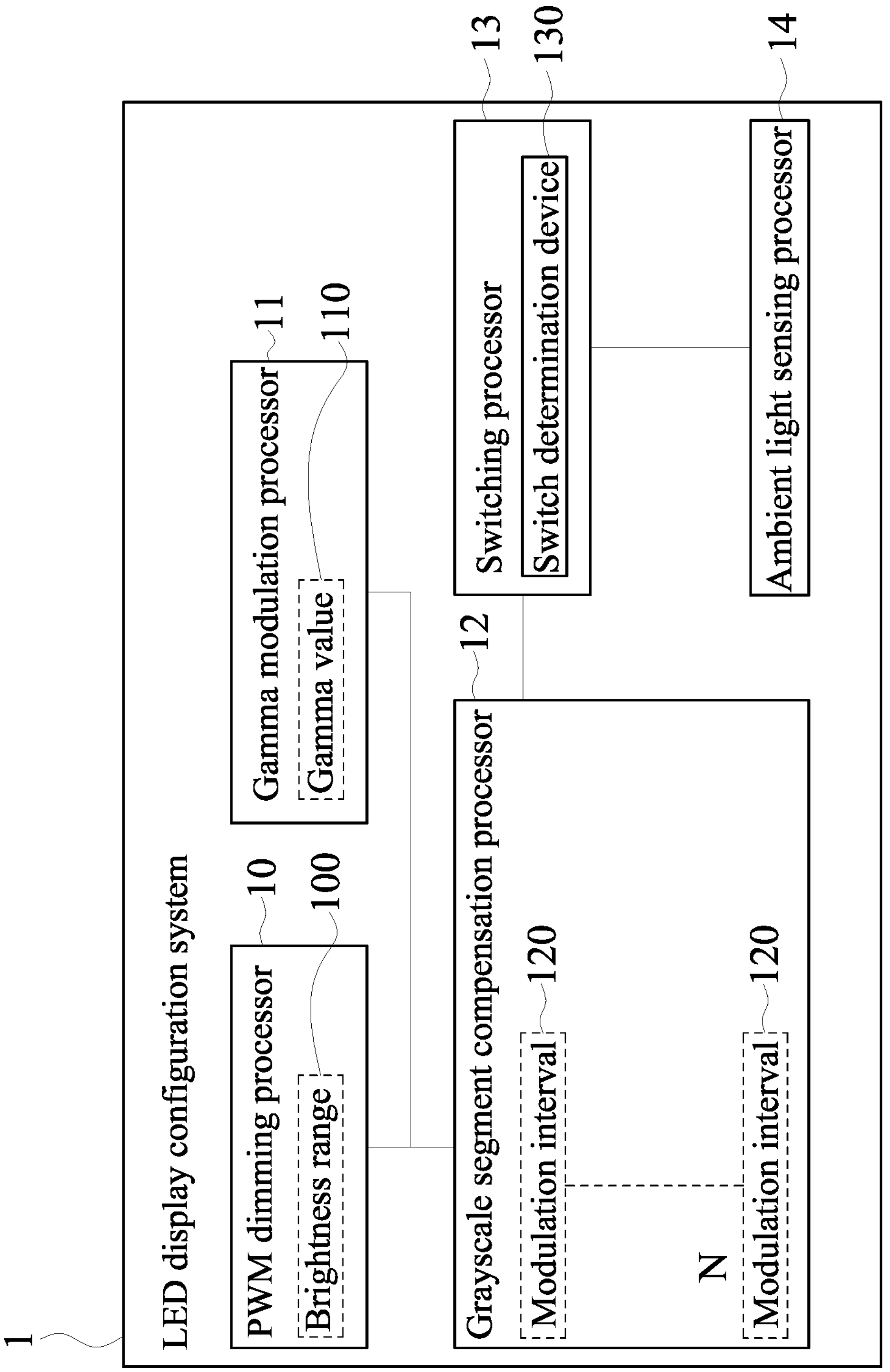
FIG. 4 is a block diagram showing the structure of the second preferred embodiment of the present disclosure.
Figure 5:
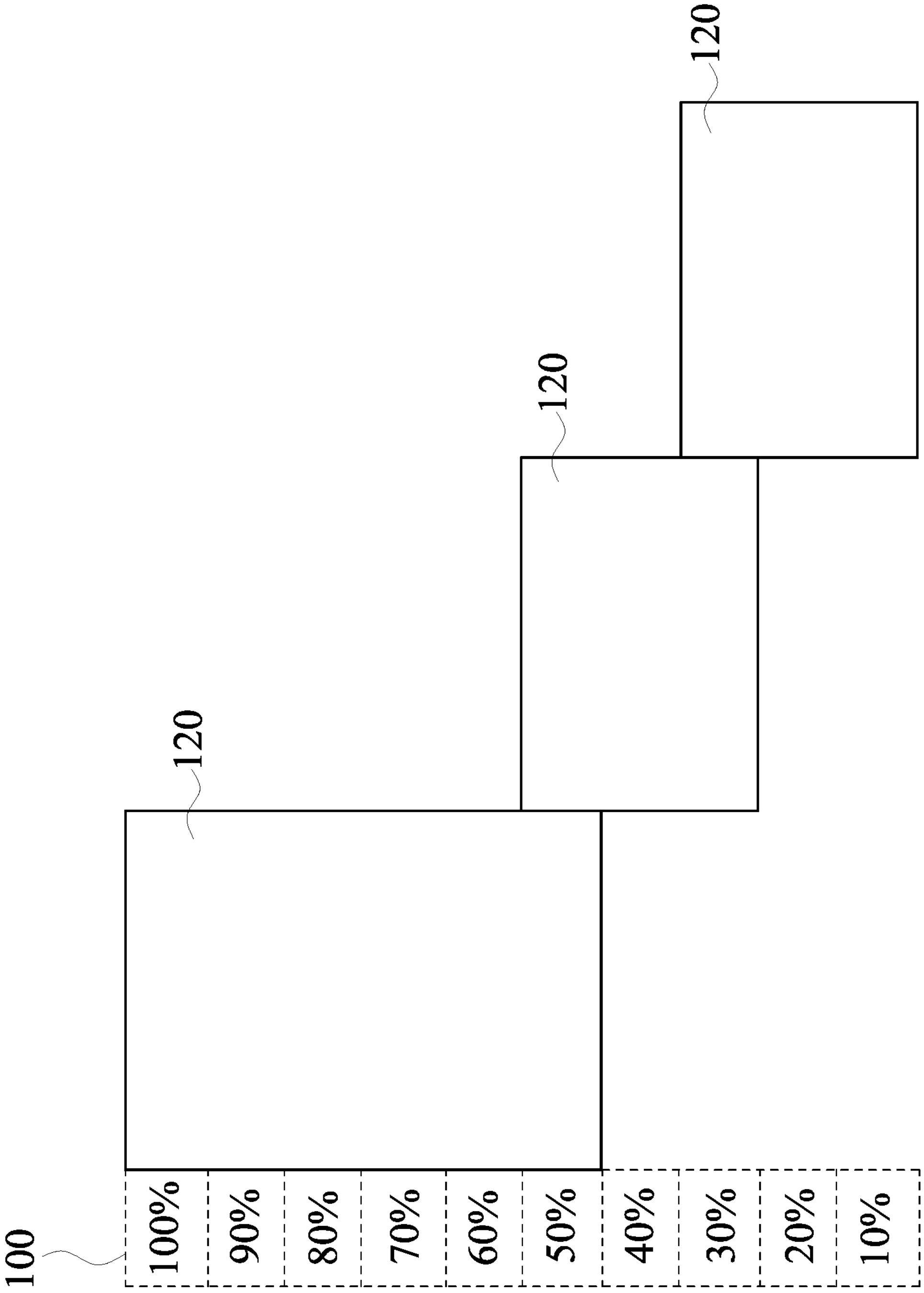
FIG. 5 is a schematic view showing a multiple of modulation intervals of the second preferred embodiment of the present disclosure.

With reference to FIGS. 1 and 2 for the schematic block diagram and flow chart of an LED display configuration system for improving grayscale recognition of human visual images in accordance with a preferred embodiment of the present disclosure respectively, the LED display configuration system for improving grayscale recognition of human visual images 1 used in a direct-view LED display screen includes a PWM dimming module 10, a Gamma modulation module 11, a grayscale segment compensation module 12 and a switching module 13, where the grayscale segment compensation module 12 is electrically connected to the PWM dimming module 10, the Gamma modulation module 11 and the switching module 13, and the Gamma modulation module 11 has a plurality of Gamma values 110 provided for selection and modulation. In order to match the luminance gradient performance of different environmental fields over time, the LED display configuration system 1 provides two different switching sensitivity configuration methods. In order to match the luminance gradient performance of different environmental fields over time, the LED display configuration system 1 provides two different switching sensitivity configuration methods. This embodiment takes the LED display screen configuration method with higher switching sensitivity as an example, which may include the following steps.

Step (S10): An adjustable brightness range 100 is expressed in percentage. The PWM dimming module 10 has the adjustable brightness range 100 expressed in percentage, and X % in the brightness range 100 is taken as a compensation reference value. Step (S11): The grayscale segment compensation module 12 sets a first current together with one of the Gamma values 110 to output light and define a first brightness range 100, X~100% in the first brightness range 100 is taken to form a first modulation interval 120 according to the compensation reference value, and Y % in the first brightness range 100 is taken as a minimum allowable value. Step (S12): The grayscale segment compensation module 12 sets a second current according to the X % brightness of the first modulation interval 120 together with one of the Gamma values 110 to output light and define a second brightness range 100, and X~100% in the second brightness range 100 is taken to form a second modulation interval 120 according to the same compensation reference value.

Step (S13): The grayscale segment compensation module 12 determines whether or not the X % brightness of the second modulation interval 120 is less than the minimum allowable value. If not, the grayscale segment compensation module 12 determines that the obtained X % brightness of the second modulation interval 120 is not less than the minimum allowable value. Step (S14): A current set according to the X % brightness of the second modulation interval 120 together with one of the Gamma values 110 are used to output light and then define a brightness range, and then the next modulation interval 120 is formed according to the same compensation reference value. In other words, if the grayscale segment compensation module 12 determines that the obtained X % brightness of the previous modulation interval 120 is not less than the minimum allowable value, and sets the next current till an $N^{th}$ current for forming the $N^{th}$ modulation interval 120, and its X % brightness is equal to or less than the minimum allowable value.

Accordingly, the grayscale segment compensation module 12 has N modulation intervals 120, wherein N is an integer greater than or equal to 2, each of the modulation intervals 120 has a set current and defines the set currents as the first current to the $N^{th}$ current. Wherein, the first modulation interval 120 uses the first current and one of the selected Gamma values 110 to output light, X % in the brightness range 100 is taken as the compensation reference value and Y % in the brightness range 100 is taken as the minimum allowable value, and the set currents corresponding to the first modulation interval 120 to the $N^{th}$ modulation interval 120 are sequentially configured according to the same compensation reference value, so that the modulation intervals 120 use the brightness range of 100%~X % as a working section. It is noteworthy that in any two adjacent modulation intervals 120, the maximum brightness outputted by the set current in the next modulation interval 120 is equal to or slightly greater than the brightness outputted at the compensation reference value in the previous modulation interval 120, so that the set currents corresponding to the first modulation interval 120 to the $N^{th}$ modulation interval 120 respectively show a power descending relationship; the brightness outputted at the compensation reference value in the $N^{th}$ modulation interval 120 is equal to or less than the brightness outputted at the minimum allowable value in the first modulation interval 120.

Step (S15): The switching module 13 is used to manually or automatically switch and select the modulation intervals 120 which are provided for setting the working brightness range of the direct-view LED display screen according to the actual product application requirements, so as to ensure that the screen has a constant and optimal image quality for a wide range of brightness applications, thus increasing the economic value of the product.

By the way, the actual configuration of the modulation intervals 120 for the direct-view LED display screen is not limited to providing all the modulation intervals 120, or using one of the modulation intervals 120.

With reference to FIGS. 3A, 3B, 4, and 5 for the flow charts and schematic block diagram of the second preferred embodiment of the present disclosure and a schematic view showing a multiple of modulation intervals respectively, in order to solve the problem that an direct-view LED display screen (not shown in the figure) is prone to a grayscale which is not correctly presented and low recognition rate which affects the image presentation quality in application of a large brightness range, the LED display configuration system for improving grayscale recognition of human visual images with a higher switching sensitivity includes the following steps. Step (S20): A brightness range 100 is adjustable and expressed in percentage, and X % in the brightness range 100 is taken as a compensation reference value; Step (S21): A first current together with one of the Gamma values 110 are used to output light and define the first brightness range 100, and X~100% in the first brightness range 100 is taken to form a first modulation interval 120 according to the compensation reference value, and Y % in the first brightness range 100 is taken as a minimum allowable value; Step (S22): A second current set according to the X % brightness of the first modulation interval 120 together with one of the Gamma values 110 are used to output light and define the second brightness range 100, and X~100% in the second brightness range 100 is used to form the second modulation interval 120 according to the same compensation reference value.

Step (S23): Whether or not the X % brightness outputted at the compensation reference value in the second modulation interval 120 is less than the minimum allowable value is determined. If the obtained X % brightness of the second modulation interval 120 is not less than the minimum allowable value, Step (S24) takes place, wherein a third current set according to the X % brightness of the second modulation interval 120 together with one of the Gamma values 110 are used to output light to define the third brightness range 100, and then the third modulation interval 120 is formed according to the same compensation reference value. Step (S25): Whether or not the X % brightness outputted at the compensation reference value in the previous modulation interval 120 is less the minimum allowable value is determined. If the obtained X % brightness of the previous modulation interval 120 is not less than the minimum allowable value, then the Step (26) will take place, and a current set according to the X % brightness of the previous modulation interval 120 together with one of the Gamma values 110 are used to output light and define the next brightness range 100, and the next modulation interval 120 is formed according to the same compensation reference value. In this way, after repeated determinations and the confirmation that the X % brightness of the previous modulation interval 120 is not less than the minimum allowable value, a current is set again until an $N^{th}$ current is formed and provided for defining the $N^{th}$ modulation interval 120 and its X % brightness is less than the minimum allowable value. If the obtained X % brightness of the previous modulation interval 120 is less than the minimum allowable value, then the Step (27) will take place. In this embodiment, X is greater than or equal to 50, Y is less than or equal to 10, each of the modulation intervals 120 adopts a different Gamma value 100, and each of the Gamma values 100 sets a coefficient for improving the Gamma modulation effect. In any two adjacent modulation intervals 120, the maximum brightness outputted from the next modulation interval 120 is equal to or slightly greater than the brightness outputted at the compensation reference value in the previous modulation interval 120, so that the set currents corresponding to the first modulation interval 120 to the $N^{th}$ modulation interval 120 respectively show a power descending relationship.

Step (S27): The current ambient light brightness is sensed automatically to output an illumination level which is provided for the Step (S28) or the Step (S29). Step (S28): The modulation intervals 120 are switched and selected manually based on the illumination level; Step (S29): An interval is selected automatically from the first modulation interval 120 to the $N^{th}$ modulation interval 120 based on the illumination level in order to set the working brightness range of the direct-view LED display screen. The present disclosure may further include but not limited to the Step (S30): After the direct-view LED display screen has selected one of the modulation intervals 120 for working, an average working brightness range of the direct-view LED display screen within a time interval is checked, and if the obtained average working brightness range is less than a default value, a range switching signal will be fed back to automatically switch to the next modulation interval 120, so that after the direct-view LED display screen is actually installed in a working environment and the staff completes the initial installation setting, the direct-view LED display screen has the functions of making an instant adjustment to adapt to the working brightness range, ensuring image presentation quality and improving user satisfaction.

In order to realize the LED display screen configuration method, the present disclosure provides an LED display configuration system 1 for improving the grayscale recognition of human visual images, and the LED display configuration system 1 includes a PWM dimming module 10, a Gamma modulation module 11, a grayscale segment compensation module 12, a switching module 13 and an ambient light sensing module 14, wherein the grayscale segment compensation module 12 is electrically connected to the PWM dimming module 10, the Gamma modulation module 11 and the switching module 13, and the switching module 13 is electrically connected to the ambient light sensing module 14. The PWM dimming module 10 has a brightness range which is adjustable and expressed in percentage 100, the Gamma modulation module 11 has a plurality of Gamma values 110 provided for selection and modulation, and the switching module 13 has a switch determination device 130.

The grayscale segment compensation module 12 includes N modulation intervals, where N is an integer greater than or equal to 2, and each of the modulation intervals 120 has a set current and defines the set currents as a first current to an $N^{th}$ current; wherein the first modulation interval 120 uses the first current and one of the selected Gamma values to output light, and X % in the brightness range 100 (such as X is greater than or equal to 50) is taken as a compensation reference value, and Y % in the brightness range 100 such as (Y is less than or equal to 10) is taken as a minimum allowable value, and the set currents corresponding to the first modulation interval 120 to the $N^{th}$ modulation interval 120 respectively are sequentially set according to the same compensation reference value. In any two adjacent modulation intervals 120, the maximum brightness outputted by the set current in the next modulation interval 120 is equal to or slightly greater than the brightness outputted at the compensation reference value in the previous modulation interval 120, so that the set currents corresponding to the first modulation interval 120 to the $N^{th}$ modulation interval 120 respectively show a power descending relationship; the brightness outputted at the compensation reference value in the $N^{th}$ modulation interval 120 is equal to or less than the brightness outputted at the minimum allowable value in the first modulation interval; wherein the modulation intervals use the brightness range of 100%~X % as a working section. Each of the modulation intervals 120 can adopt a different Gamma value 110, and each of the Gamma values 110 sets a coefficient, such that the set current, the Gamma value 110 and at least one of its coefficients in each of the modulation intervals 120 can be adjusted to improve the Gamma modulation effect and stabilize the screen display quality.

The ambient light sensing module 14 automatically senses the current ambient light brightness to output an illumination level for reference, and then the switching module 13 is provided for automatically switching and selecting the modulation intervals 120, or the ambient light sensing module 14 outputs the illumination level to the switching module 13, such that the switching module 13 can automatically switch and select the modulation intervals 120 according to the illumination level. In a possible implementation mode, the switch determination device 130 checks an average working brightness range of the direct-view LED display screen in a time interval, after the direct-view LED display screen selects one of the modulation intervals 120 for working, and the switch determination device 130 feeds back a range switching signal to cause the switching module 13 to automatically switch to the next modulation interval 120 when it is known from the comparison that the average working brightness range falls in an overlapped range of two consecutive modulation intervals. For example, the maximum brightness output of the set current of the second modulation interval 120 is equal to or slightly greater than the brightness outputted at the compensation reference value in the first modulation interval 120, so the two has an overlapped range. At this time, if the direct-view LED display screen selects the first modulation interval 120 for working, the switch determination device 130 will check and obtain the average working brightness range of the joint of the overlapped range or in the overlapped area between the first modulation interval 120 and the second modulation interval 120, and will feed back the switching signal, so that the switching module 13 can switch to the second modulation interval 120 for working.

Figure 6:
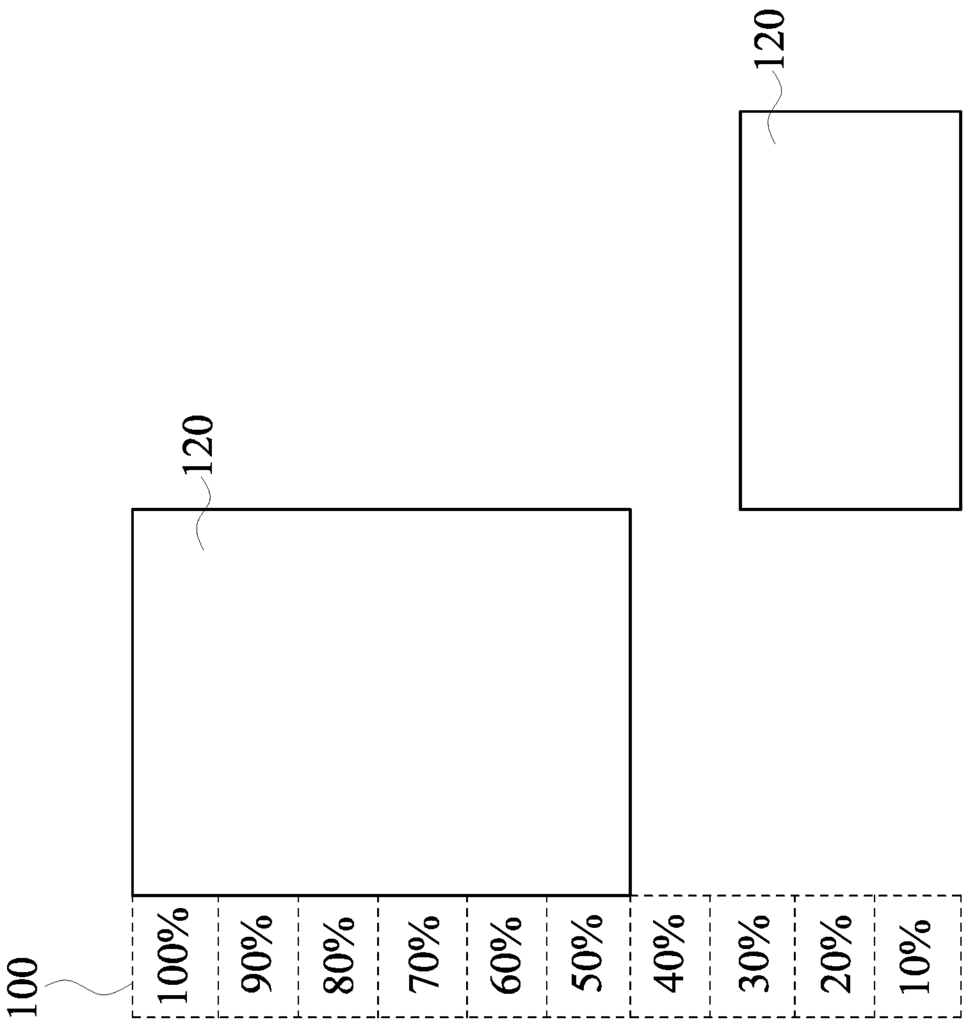
FIG. 6 is a schematic view showing a multiple of modulation intervals of a third preferred embodiment of the present disclosure.

In addition, the present disclosure also discloses an LED display configuration system, used in a direct-view LED display screen, for improving grayscale recognition of human visual images 1, which has a slightly lower sensitivity compared to the pervious embodiment, and the modulation intervals 120, which has a smaller number of modulation intervals as shown in FIG. 6, in order to meet the actual needs of customers and improve the satisfaction of the product practicality. The present disclosure also discloses an LED display configuration system for improving grayscale recognition of human visual images 1, which is adapted to the service application field by configuring the modulation intervals 120 with a smaller number of modulation intervals as shown in FIG. 6, in order to satisfy the actual needs of the customer and enhance the practical satisfaction of the product.

The LED display configuration system 1 includes a PWM dimming module 10, a Gamma modulation module 11, a grayscale segment compensation module 12, a switching module 13 and an ambient light sensing module 14, wherein the grayscale segment compensation module 12 is electrically connected to the PWM dimming module 10, the Gamma modulation module 11 and the switching module 13, and the switching module 13 is electrically coupled to the ambient light sensing module 14. The PWM dimming module 10 has a brightness range which is adjustable and expressed in percentage 100, and the Gamma modulation module 11 has a plurality of Gamma values 110 provided for selection and modulation, and each of the Gamma values 110 sets a coefficient for improving the Gamma modulation effect.

The grayscale segment compensation module 12 has N modulation intervals 120, wherein N is an integer greater than or equal to 2, each of the modulation intervals 120 has a set current and defines the set currents as a first current to an $N^{th}$ current respectively, and the first modulation interval 120 uses the first current together with one of the selected Gamma values 110 to output light, X % in the brightness range 100 (where X is greater than or equal to 50) is taken as a compensation reference value, and Y % in the brightness range 100 (where Y is less than or equal to 10) is taken as a minimum allowable value, the set currents corresponding to the first modulation interval 120 to the $N^{th}$ modulation interval 120 respectively are sequentially configured according to the same compensation reference value. Wherein, each of the modulation intervals 120 may adopt a different Gamma value, and in any two adjacent modulation intervals 120, the maximum brightness outputted by the set current in the next modulation interval 120 is less than the brightness outputted at the compensation reference value in the previous modulation interval 120, so that the set currents corresponding to the first modulation interval 120 to the $N^{th}$ modulation interval 120 respectively show a power descending relationship; and the brightness outputted at the compensation reference value in the $N^{th}$ modulation interval 120 is equal to or less than the brightness outputted at the minimum allowable value in the first modulation interval 120. When N equals to 2, there is an interval with the 7~26% brightness range 100 of the first modulation interval 120 between the X % brightness outputted from the first modulation interval 120 and the 100% brightness outputted from the second modulation interval 120.

The switching module 13 is provided for manually or automatically switching and selecting the modulation intervals 120, and the ambient light sensing module 14 is provided for automatically sensing the ambient light brightness and outputting an illumination level for reference. The ambient light sensing module 14 automatically senses the current light brightness of the environment and outputs an illumination level for reference and manually switches the modulation intervals 120; or the ambient light sensing module 14 outputs the illumination level to the switching module 13, so that the switching module 13 automatically switches the modulation intervals 120 according to the illumination level.

Wherein, the modules described in the present disclosure are realized by means of hardware or software supplemented by hardware, such as the PWM dimming module 10, the Gamma modulation module 11, the grayscale segment compensation module 12, the switching module 13 and the ambient light sensing module 14. The definition of the PWM dimming module 10, Gamma modulation module 11, grayscale segment compensation module 12, switching module 13 and ambient light sensing module 14 essentially refers to the integration of various hardware devices such as central processing units (CPUs), microprocessors, memories, signal transmitters, sensors, display chips or transformers, and supplemented with a software program.

In summation of the description above, the present disclosure combines the conventional technical means of adjusting a combination of currents and correcting the Gamma value to achieve the purpose of high image grayscale recognition effect under large brightness range applications. In other words, through the $1^{st}$ to $N^{th}$ currents in the power descending relationship together with each of the selected the Gamma values, the operation also corresponds to the technical means of the $1^{st}$ to $N^{th}$ modulation intervals in the power relationship, which provides an image display capability with a large brightness range to facilitate the direct-view LED display screen to switch and select the working brightness range that meets the environmental lighting requirements according to the actual use environment from the modulation intervals, so as to improve the market adaptability and economic benefits of screen products. Furthermore, for the difference in brightness gradient over time, the environment of different fields can be adopted and implemented separately using the technical means with different switching sensitivities disclosed by the present disclosure, thereby greatly improving the applicability to meet the needs of various environments or devices.

What is claimed is:

1. A light emitting diode (LED) display configuration system, for improving grayscale recognition of human visual images, used in a direct-view LED display screen, comprising:

a pulse-width modulation (PWM) dimming processor, with a brightness range that is adjustable and expressed in percentage;

a Gamma modulation processor, with a plurality of Gamma values provided for selection and modulation;

a grayscale segment compensation processor, electrically coupled to the PWM dimming processor and the Gamma modulation processor, comprising N modulation intervals; and a switching processor, electrically coupled to the grayscale segment compensation processor, and provided for manually or automatically switching and selecting the N modulation intervals, wherein N is an integer greater than or equal to 2, and each of the N modulation intervals has a set current and defines the set currents as a first current to an $N^{th}$ current, a first modulation interval uses the first current and one of selected Gamma values to output light, and the grayscale segment compensation processor takes X % in the brightness range as a compensation reference value and Y % in the brightness range as a minimum allowable value, and sequentially configures the set currents corresponding to the N modulation intervals respectively according to the same compensation reference value, in any two adjacent modulation intervals, a maximum brightness outputted by the set current in a next modulation interval is equal to or greater than a brightness outputted at the compensation reference value in a previous modulation interval, so that the set currents corresponding to the N modulation intervals show a power descending relationship, a brightness outputted at the compensation reference value in the $N^{th}$ modulation interval is equal to or less than a brightness outputted at the minimum allowable value in the first modulation interval, and the N modulation intervals use the brightness range of 100%~X % as a working section.

2. The LED display configuration system according to claim 1, wherein each of the N modulation intervals adopts a different Gamma value, and each of the plurality of Gamma values sets a coefficient for improving a Gamma modulation effect.

3. The LED display configuration system according to claim 1, wherein X is greater than or equal to 50, and Y is less than or equal to 10.

4. The LED display configuration system according to claim 3, wherein each of the N modulation intervals adopts a different Gamma value, and each of the plurality of Gamma values sets a coefficient for improving a Gamma modulation effect.

5. The LED display configuration system according to claim 3, further comprising an ambient light sensing processor electrically coupled to the switching processor, wherein the ambient light sensing processor automatically senses a current ambient light brightness to output an illumination level for reference, and manually switches and selects the N modulation intervals, or the ambient light sensing module outputs the illumination level to the switching processor, such that the switching processor automatically switches and selects the N modulation intervals according to the illumination level.

6. The LED display configuration system according to claim 5, wherein each of the N modulation intervals adopts a different Gamma value, and each of the plurality of Gamma values sets a coefficient for improving a Gamma modulation effect.

7. The LED display configuration system according to claim 3, wherein the switching processor comprises a switch determination device which checks an average working brightness range of the direct-view LED display screen in a time interval after the direct-view LED display screen selects one of the N modulation intervals for working, and the switch determination device feeds back a range switching signal to cause the switching processor to automatically switch to a latter modulation interval when the switching processor knows, from a comparison, that the average working brightness range falls in an overlapped range of two consecutive modulation intervals.

8. The LED display configuration system according to claim 7, wherein each of the N modulation intervals adopts a different Gamma value, and each of the plurality of Gamma values sets a coefficient for improving a Gamma modulation effect.

9. A light emitting diode (LED) display configuration system, for improving grayscale recognition of human visual images, used in a direct-view LED display screen, comprising:

a pulse-width modulation (PWM) dimming processor, with a brightness range that is adjustable and expressed in percentage;

a Gamma modulation processor, with a plurality of Gamma values provided for selection and modulation;

a grayscale segment compensation processor, electrically coupled to the PWM dimming processor and the Gamma modulation processor, comprising N modulation intervals; and a switching processor, electrically coupled to the grayscale segment compensation processor, for manually or automatically switching and selecting the N modulation interval, wherein N is an integer greater than or equal to 2, and each of the N modulation intervals has a set current and defines the set currents as a first current to an $N^{th}$ current, a first modulation interval uses the first current and one of selected Gamma values to output light, and the grayscale segment compensation processor takes X % in the brightness range as a compensation reference value and Y % in the brightness range as a minimum allowable value, and sequentially configures the set currents corresponding to the N modulation intervals respectively according to the same compensation reference value, in any two adjacent modulation intervals, a maximum brightness outputted by the set current in a next modulation interval is less than a brightness outputted at the compensation reference value in a previous modulation interval, so that the set currents corresponding to the N modulation intervals show a power descending relationship, and a brightness outputted at the compensation reference value in the $N^{th}$ modulation interval is equal to or less than a brightness outputted at the minimum allowable value in the first modulation interval.

10. The LED display configuration system according to claim 9, wherein when N is equal to 2, an interval with the brightness range of 7~26% of the first modulation interval exists between a X % brightness outputted from the first modulation interval and a 100% brightness outputted from the second modulation interval.

11. The LED display configuration system according to claim 9, wherein X is greater than or equal to 50, and Y is less than or equal to 10.

12. The LED display configuration system according to claim 11, wherein when N is equal to 2, an interval with the brightness range of 7~26% of the first modulation interval exists between a X % brightness outputted from the first modulation interval and a 100% brightness outputted from the second modulation interval.

13. The LED display configuration system according to claim 11, further comprising an ambient light sensing module electrically coupled to the switching module, wherein the ambient light sensing processor automatically senses a current ambient light brightness to output an illumination level for reference, and manually switches and selects the N modulation intervals, or the ambient light sensing module outputs the illumination level to the switching processor, so that the switching processor automatically switches and selects the N modulation intervals according to the illumination level.

14. The LED display configuration system according to claim 13, wherein when N is equal to 2, an interval with the brightness range of 7~26% of the first modulation interval exists between a X % brightness outputted from the first modulation interval and a 100% brightness outputted from the second modulation interval.

15. The LED display configuration system according to claim 14, wherein each of the N modulation intervals adopts a different Gamma value and each of the plurality of Gamma values sets a coefficient for improving a Gamma modulation effect.

* * * * *